(12) United States Patent
Scoda (10) Patent No.: US 9,275,023 B2
(45) Date of Patent: Mar. 1, 2016

(54) METHODS FOR FURTHER ADAPTING XSL TO HTML DOCUMENT TRANSFORMATIONS AND DEVICES THEREOF

(75) Inventor: Enrico Scoda, Matignacco (IT)

(73) Assignee: Usablenet Inc., New York, NY (US)

( * ) Notice: Subject to any disclaimer, the term of this patent is extended or adjusted under 35 U.S.C. 154(b) by 1378 days.

(21) Appl. No.: 12/806,716

(22) Filed: Aug. 20, 2010

(65) Prior Publication Data

US 2012/0047429 A1 Feb. 23, 2012

(51) Int. Cl.
*G06F 17/00* (2006.01)
*G06F 17/22* (2006.01)

(52) U.S. Cl.
CPC .......... *G06F 17/227* (2013.01); *G06F 17/2247* (2013.01)

(58) Field of Classification Search
CPC .......................... G06F 17/2247; G06F 17/227
USPC ......................................... 715/234–236, 239
See application file for complete search history.

(56) References Cited

U.S. PATENT DOCUMENTS

2004/0010753 A1* 1/2004 Salter et al. ................... 715/513
2004/0107250 A1 6/2004 Marciano
2004/0261017 A1* 12/2004 Perry ............................. 715/513
2005/0021548 A1* 1/2005 Bohannon et al. ............ 707/101
2006/0074904 A1 4/2006 Mungara et al.
2007/0214411 A1* 9/2007 Puthiyaveettil ............... 715/523
2008/0114719 A1* 5/2008 Anderson et al. ................ 707/2
2008/0126402 A1* 5/2008 Sikchi et al. ................... 707/102
2009/0100056 A1 4/2009 Cheng
2009/0150769 A1 6/2009 Konnola et al.
2010/0058467 A1 3/2010 Ivory et al.

OTHER PUBLICATIONS

John R. Gardner et al, XSLT and XPATH A Guide to XML Trasnformations, 2002, Pretince Hall, pp. 4-6, 21—Chapter 7, 121.*
International Search Report for International Patent Application No. PCT/US2011/048058 (Mar. 23, 2012).

* cited by examiner

*Primary Examiner* — Scott Baderman
*Assistant Examiner* — Howard Cortes
(74) *Attorney, Agent, or Firm* — LeClairRyan, a Professional Corporation (57) ABSTRACT

A method, computer readable medium and apparatus for further adapting XSL to HTML document transformations includes identifying with a web computing device one or more rules in an HTML document. An action associated with each of the identified one or more rules is identified with the web computing device. The identified actions are filtered with the web computing device based on one or more filtering rules when two or more of the identified actions have a match. The remaining identified actions after the filtering are applied with the web computing device to transform the one or more rules in the HTML document. The transformed HTML document is provided by the web computing device.

36 Claims, 5 Drawing Sheets

```
<?xml version="1.0" encoding="UTF-8"?>
<xsl:stylesheet xnlns:xsl-"http://www.w3.org/1999/XSL/Transform" version="1.0")

<xsl:template match="a[@target='_blank' and img]">
        <a href="{myext:normalize-url(@href)}" class="external">,
            <xsl:value-of select="img/@alt"/>
        </a>
    </xsl:template>

<xsl:template match="a[@target='_blank']">
        <a href="{myext:normalize-url(@href)}" class="external">,
            <xsl:apply-templates/>
        </a>
    </xsl:template>

<xsl:template match="a[img]">
        <a href="{myext:normalize-url(@href)}" class="internal">,
            <xst:value-of select="img/@alt"/>
        </a>
    </xsl:template>

<xsl:template match="a">
        <a hret="{myext:normalize-url(@href)}" class=internal">,
            <xsl:apply-templates/>
        </a>
    </xsl:template>

<xsl:template match="*">
        <xsl:copy>
            <xsl:copy-of select="@*"/>
            </xsl:apply-templates/>
        </xsl:copy>
    </xsl:template>

</xsl:stylesheet>
```

```
<rules>

<rule for = "a">
        <match>@target='_blank'</match>
        <execute>
            <set-attribute name = "class">external</set-attribute>
            <remove-attribute name = "target"/>
        </execute>
    </rule>

<rule for = "a">
        <match>img</match>
        <execute>
            <set-content>
                <xsl:value-of, select = "img/@alt"/>
            </set-content>
        </execute>
    </rule>

<rule for ="a">
        <match>true()</match>
        <execute>
            <set-attribute name = "class">internal</set-attribute>
            <set-attribute name = "href" select = "myext:normalize-url(@href)"/>
        </execute>
    </rule>

</rules>
```

*FIG. 4*

```xml
<?xml version = "1.0" encoding = "UTF-8?>
<xsl:stylesheet xmln:xsl="http://ww.w3.org/1999/XSL/Transform" version="1.0"

<xsl:template match="a">
        <xsl:copy>
            <xsl:attribute name="href"><xsl:value-of select-"myext:normalize-
            url(@href)"/></xsl:attribute>
            <xsl:choose>
                <xsl:when test = "@target='_blank">
                    <xsl:attribute name="class">external</xsl:attribute>
                </xsl:when>
                <xsl:otherwise>
                    <xsl:attribute name = "class">internal</xsl:attribute>
                    <xsl:if test="@target">
                        <xsl:copy-of select="@target"/>
                    </xsl:if>
                </xsl:otherwise>
            </xsl:choose>
            <xsl:choose>
                <xsl:when test = "img">
                    <xsl:value-of select = "img/@alt"/>
                </xsl:when>
                <xsl:otherwise>
                    <xsl:apply-templates/>
                </xsl:otherwise>
            </xsl:choose>
        </xsl:copy>
    </xsl:template>

<xsl:template match-"*">
        <xsl:copy>
            <xsl:copy-of select="@*"/>
            <xsl:apply-templates/>
        </xsl:copy>
    </xsl:template>

</xsl:stylesheet>
```

*FIG. 5*

METHODS FOR FURTHER ADAPTING XSL TO HTML DOCUMENT TRANSFORMATIONS AND DEVICES THEREOF

FIELD

This technology generally relates to methods for adapting eXtensible Stylesheet Language (XSL) to HTML document transformations and devices thereof.

BACKGROUND

The introduction of eXtensible Markup Language (XML) and the EXtensibleStylesheet Language (XSL) specifications has provided an easy way to transform documents between various formats. This functionality has been included into Web development frameworks, giving them the ability to transform automatically an XML file into a document with different format such as HTML or XHTML, integrating the original data with graphic layout and user interface components. The XSL specifications are based on special constructs called templates that match a single element or a set of similar elements and rewrite them and their content based on instructions defined in the template.

Unfortunately, a problem arises when the structure of the XML document to process is not well defined. For example, the same element can be used for different purposes inside the XML document and based on these purposes multiple different transformations must be implemented. The problems get even worse when the task involves transforming HTML documents. For example the link element "a" can appear over a thousand times in different sections of a web page, such as in the main navigation bar, in hidden menus, to make images clickable, and as a button to execute JavaScript functions. Writing XSL templates that modify all these elements can increase complexity in an unpredictable way.

Figure 1:
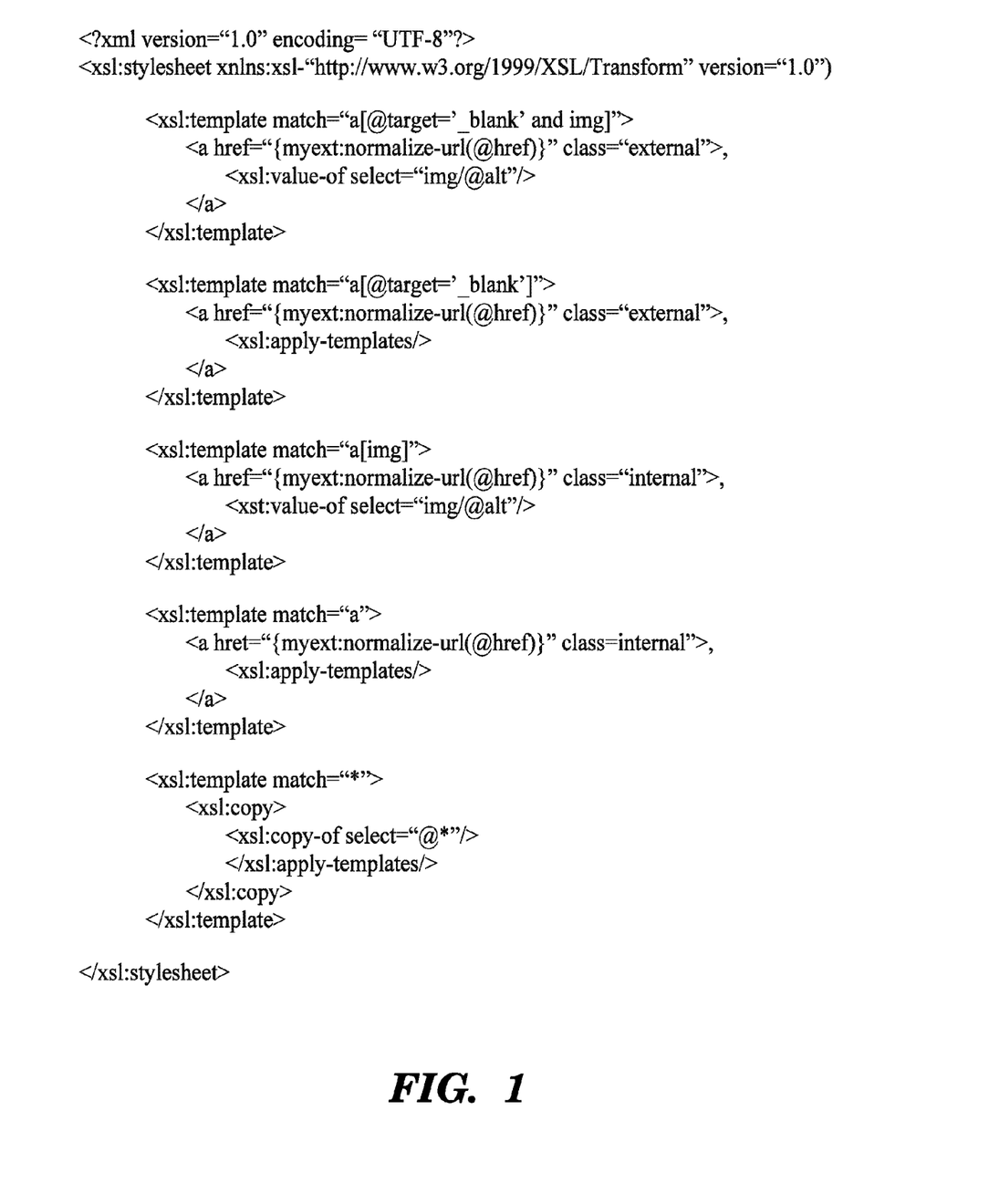
FIG. 1 is an exemplary XSL file managing HTML links.

An illustrative example of these difficulties with a simple XSL file managing HTML links ("a" elements) is shown in FIG. 1. As illustrated, the XSL file:
  (1) changes the "href" attribute using an XPath extension function called myext:normalize-url( );
  (2) if the link contains "target" attribute with value "_blank", remove it and set "class" attribute to "external" value, otherwise "class" attribute will get value "internal";
  (3) if the "a" content is an image ("img" element), then set new content to image "alt" attribute otherwise apply templates to its children; and
  (4) use the "identity" template (last one) to simply copy elements as they are if they are not "a" elements.

Accordingly, as shown the same instructions have to be written at least twice to keep templates simple and to cover all the combinations of the above transformations. More powerful XSL constructs like name templates or xsl:choose or xsl:if could be utilized and the resulting XSL document will be more optimized, but also will be more complex and less readable.

SUMMARY

A method for further adapting XSL to HTML document transformations includes identifying with a web computing device one or more rules matching one or more elements in an HTML document. An action associated with each of the identified one or more rules is identified with the web computing device. The identified actions are filtered with the web computing device based on one or more filtering rules when two or more of the identified actions have a match. The remaining identified actions after the filtering are applied with the web computing device to transform the one or more matching elements in the HTML document. The transformed HTML document is provided by the web computing device.

A computer readable medium having stored thereon instructions processing multiple documents from multiple sites comprising machine executable code which when executed by at least one processor, causes the processor to perform steps including identifying one or more rules matching one or more elements in an HTML document. An action associated with each of the identified one or more rules is identified. The identified actions are filtered based on one or more filtering rules when two or more of the identified actions have a match. The remaining identified actions after the filtering are applied to transform the one or more matching elements in the HTML document. The transformed HTML document is provided.

A web computing apparatus includes one or more processors and a memory coupled to the one or more processors which are configured to execute programmed instructions stored in the memory including identifying one or more rules matching one or more elements in an HTML document. An action associated with each of the identified one or more rules is identified. The identified actions are filtered based on one or more filtering rules when two or more of the identified actions have a match. The remaining identified actions after the filtering are applied to transform the one or more matching elements in the HTML document. The transformed HTML document is provided.

This technology provides a number of advantages including providing a method, computer readable medium and apparatus that further adapts XSL to HTML document transformations. More specifically, examples of this technology identify a set of similar elements, i.e. sharing same properties, and then defines a set of actions to take on those elements, such as rename, set/change attributes, and set their content. With this technology, if one element is member of two or more sets, then all actions defined for these sets can be applied to the element. This enable smaller sets of instructions to be defined for well defined sets of elements without the need of rewriting same instructions for different sets. These sets of instructions are then transformed into XSL instructions that can be processed by any XSL processor.

DETAILED DESCRIPTION

Figure 2:
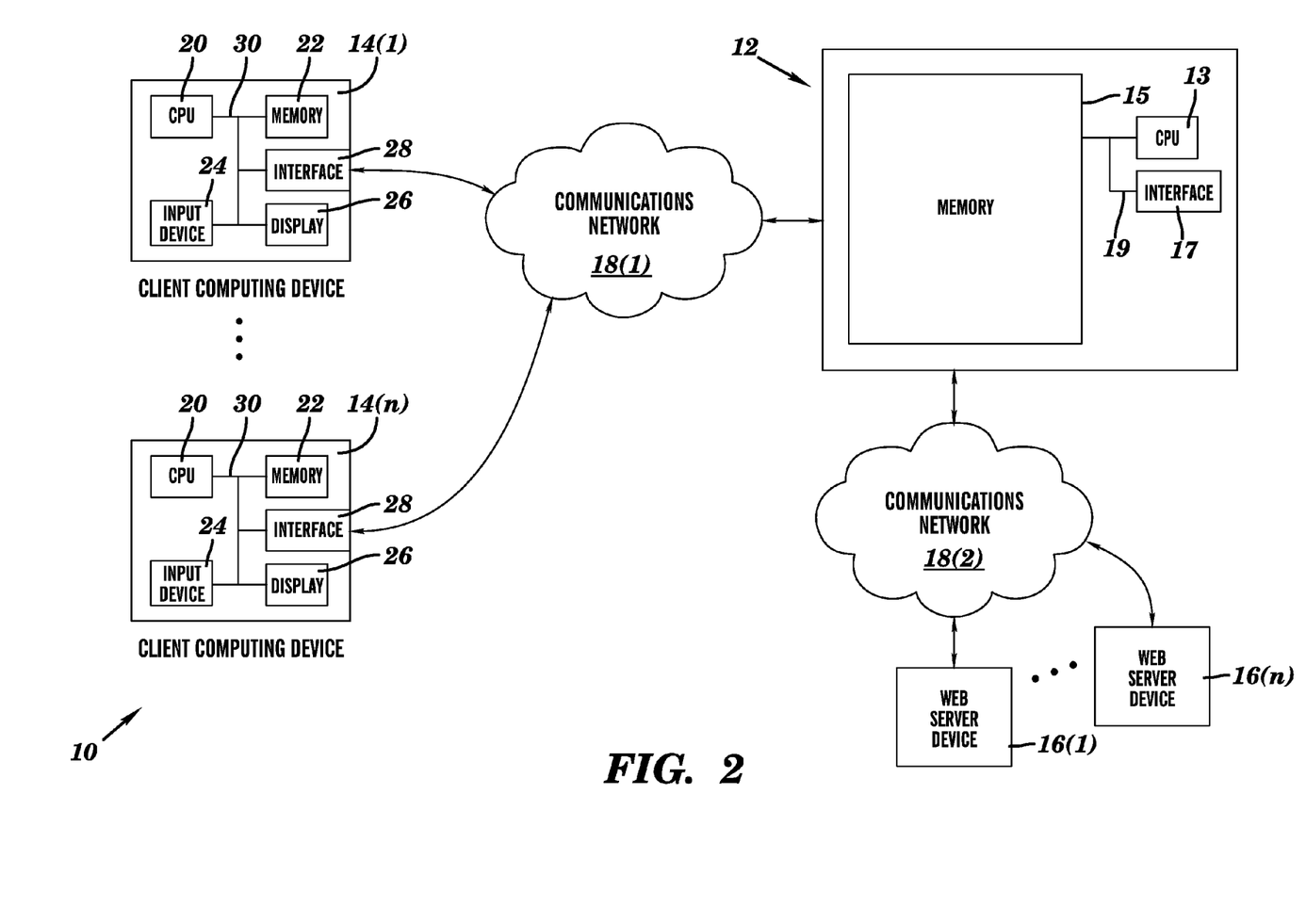
FIG. 2 is a block diagram of an exemplary system with a proxy server configured to adapt XSL to HTML document transformations.

An exemplary environment 10 with a proxy server 12 configured to further adapt XSL to HTML document transformation is illustrated in FIG. 2, although this technology can be implemented on other types of devices, such as one of the web server devices 16(1)-16(n) by way of example only. The exemplary environment 10 includes the proxy server or apparatus 12, client devices 14(1)-14(n), the web server devices 16(1)-16(n), and communication networks 18(1)-18

(2), although other numbers and types of systems, devices, and/or elements in other configurations and environments with other communication network topologies can be used. This technology provides a number of advantages including providing a method, computer readable medium and an apparatus that further adapts XSL to HTML document transformations.

Referring more specifically to FIG. 2, the proxy server 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the proxy server 12 executes a program of stored instructions one or more aspects of the present invention as described and illustrated by way of the embodiments herein, although the processor could execute other numbers and types of programmed instructions.

The memory 15 in the proxy server 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the proxy server 12.

The interface system 17 in the proxy server 12 is used to operatively couple and communicate between the proxy server 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, get and interact with web pages from one or more web sites hosted by the web server devices 16(1)-16(n) through the proxy server 12 via one or more communication networks, although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In this example, the client devices 14(1)-14(n) comprise mobile devices with Internet access that permit a website form page or other retrieved data to be displayed, although each of the client devices 14(1)-14(n). By way of example only, one or more of the client devices 14(1)-14(n) can comprise smart phones, personal digital assistants, or computers.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n.

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems although other types and numbers of user input devices can be used.

The display 26 in each of the client devices 14(1)-14(n) is used to show data and information to the user, such as website page by way of example only. The display in each of the client devices 14(1)-14(n) is a phone screen display, although other types and numbers of displays could be used depending on the particular type of client device.

The interface system 28 in each of the client devices 14(1)-14(n) is used to operatively couple and communicate between the client devices 14(1)-14(n) and the proxy server 12 and web server devices 16(1)-16(n) over the communication networks 18(1) and 18(2), although other types and numbers of communication networks with other types and numbers of connections and configurations can be used.

The web server devices 16(1)-16(n) provide one or more pages from one or more web sites for use by one or more of the client devices 14(1)-14(n) via the proxy server 12, although the web server devices 16(1)-16(n) can provide other numbers and types of applications and/or content and can have provide other numbers and types of functions. Although web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations can be used. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n) and the proxy server 12 and the client devices 14(1)-14(n) via communication networks 18(1) and 18(2), although other types and numbers of communication networks with other types and numbers of connections and configurations can be used.

Although embodiments of the proxy server 12, the client devices 14(1)-14(n), and the web server devices 16(1)-16(n), are described and illustrated herein, each of the client devices 14(1)-14(n), the proxy server 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 3:
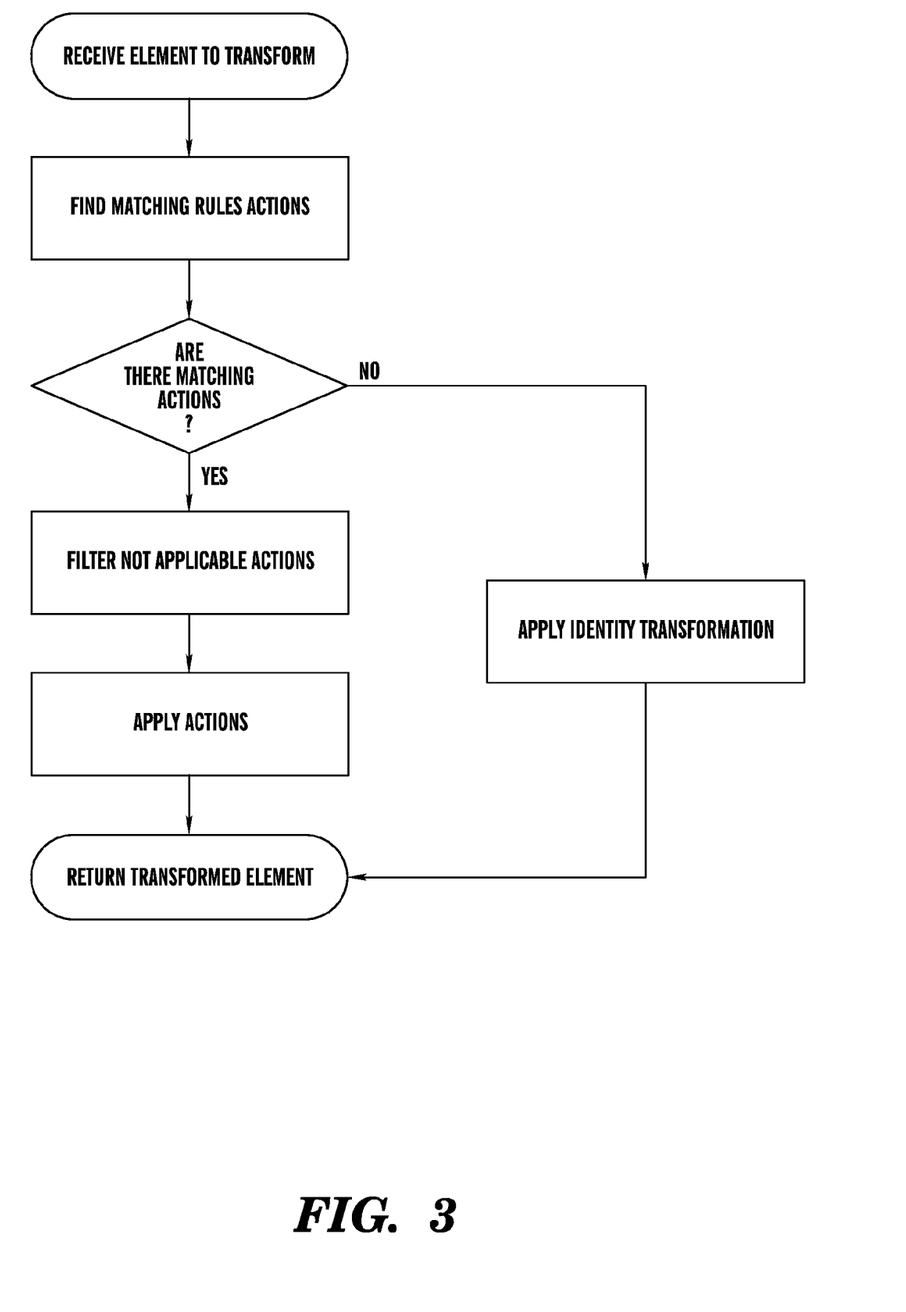
FIG. 3 is a flow chart of an exemplary method for adapting XSL to HTML document transformations.

An exemplary method for further adapting XSL to HTML document transformations with proxy server 12 will now be described with reference to FIGS. 2-5, although again this technology can be executed by other types of devices, such as by one of the web server devices 16(1)-16(n) and without a proxy server by way of example only. Referring more specifically to FIG. 3, in step 100 the proxy server 12 receives an HTML document to transform from one of the web server devices 16(1)-16(n) for one of the client computing devices 14(1)-14(n), although this exemplary method can be executed by other types and numbers of devices. The proxy server 12 traverses the HTML document to identify each element and generate rules for each identified element. In this particular example, the rules files illustrated in FIG. 4 are rules written for HTML element "a", although the HTML document can have other types of and numbers of elements and rules.

Figure 4:
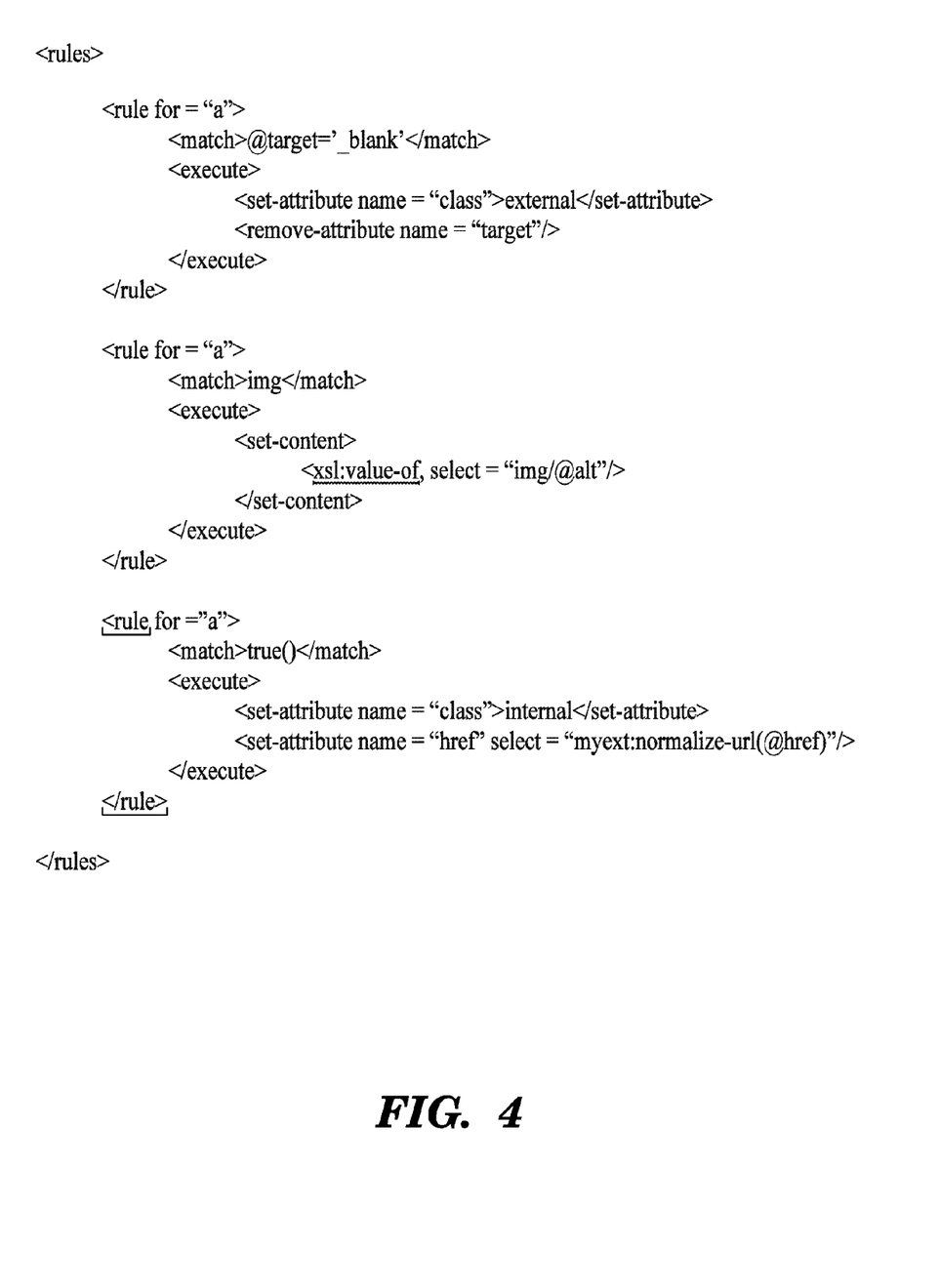
FIG. 4 are three exemplary rules.

In step 102, the proxy server 12 identifies the action(s) defined for each rule in the rules files shown in FIG. 4 matching the HTML element being analyzed, although other manners for finding the action(s) could be used. The action(s) are statements that when executed change some properties of the matched element and are defined by the XML element(s) that are a child or children of the rule execute section. The match section of the rule is an XPath expression used to identify the other HTML elements matching the rule, although other matching expressions could be used. In this exemplary embodiment the available actions are: (1) remove-element: to remove the matched element; (2) replace-element: to replace the matched element with a new element (changing its name); (3) linearize-table: to take some (or all) the cells of the matched HTML table and place their content in a different order thanks to multiple instructions called show-cell (for example <show-cell row="3" col="2"/>; (4) set-meta-category: to set the value of a special attribute called un-meta for the matched element; (5)move-bottom: take matched element and move it to the bottom of the document; (6) set-attribute: to set/change the value of a given attribute of matched element; (7) remove-attribute: to remove a given attribute of matched element; (8) set-content: to set new content for the matched element; (9) append-content: to append new content after the last child of current element. It's evident that some elements to be transformed can match two or even more sets of actions. In this case all sets actions will be "eligible" to be applied to the element. The priority/conflict rules defined for the language will be applied to filter actions and to decide which ones to use.

In step 104, the proxy server 12 determines whether any of the identified actions for the rules match. If in step 104, the proxy server 12 determines there are no matching actions, then the No branch is taken to step 106. In step 106, the proxy server 12 executes the actions on the rules to transform the HTML document. If in step 104, the proxy server 12 determines there are matching actions, then the Yes branch is taken to step 108.

In step 108, the proxy server 12 applies one or more filtering rules to filter the out the matching actions which are not applicable, although other manners for filtering the matching actions can be used. In this example, the filtering rules are: (1) group all matching actions based on document order of appearance (2) if the action is remove-element, then remove all of the following: remove-element; replace-element; linearize-table; set-meta-category; move-bottom; set-attribute; remove-attribute; set-content; and append-content; (3) if the action is replace-element, then remove all of the following: remove-element; replace-element; and linearize-table; (4) if the action is linearize-table, then remove all of the following: remove-element; replace-element; linearize-table; set-meta-category; set-attribute; remove-attribute; set-content; append-content. Furthermore remove all preceding: set-meta-category; set-attribute; remove-attribute; set-content; and append-content. (5) if the action is set-meta-category, then remove all following: remove-element, set-meta-category; (6) if action is move-bottom, remove all following: remove-element and move-bottom; (7) if the action is set-attribute, then remove all following: remove-element; set-attribute if name parameter of following action is equal to the name parameter of the matching action; and remove-attribute if name parameter of following action is equal to the name parameter of the matching action; (8) if the action is remove-attribute, then remove all following: remove-element; set-attribute if name parameter of following action is equal to the name parameter of the matching action and remove-attribute if name parameter of following action is equal to the name parameter of the matching action; (9) if the action is set-content, then remove all following: remove-element; set-content and append-content; and (10) if the action is append-content, then remove all following: remove-element; set-content; and append-content.

In step 110, the proxy server 12 applies the remaining action(s) which remain after the filtering to transform the elements of the HTML document. In step 112, the proxy server 12 provides the transformed elements of the HTML document.

Figure 5:
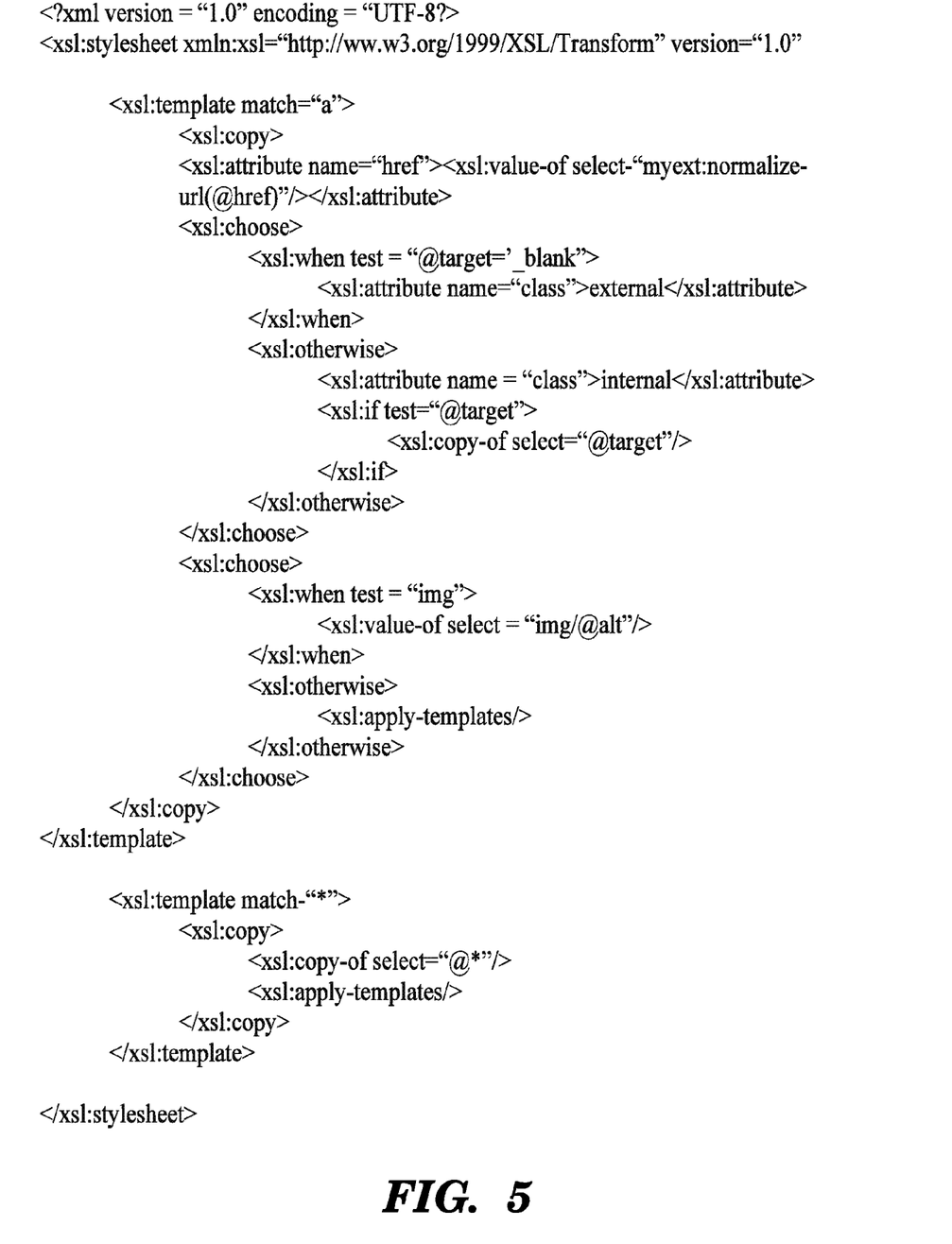
FIG. 5 is a resulting XSL file from an automatic translation of the rules files shown in FIG. 4 into XSL format.

In this particular example, the XSL file resulting from the automatic translation of the rules files shown in FIG. 4 into the XSL format is illustrated in FIG. 5. As shown, the resulting XSL file can be even more complex than the original XSL file shown in FIG. 1. This is expected since the new language has been created to transfer complexity at the machine level.

Accordingly, as illustrated and described herein this technology provides a number of advantages including providing a method, computer readable medium and an apparatus that further adapts XSL to HTML document transformations. More specifically, examples of this technology identify a set of similar elements, i.e. sharing the same properties, and then defines a set of actions to take on those elements, such as rename, set/change attributes, and set their content. With this technology, if one element is member of two or more sets, then all actions defined for these sets can be applied to the element. This enables smaller sets of instructions to be defined for well defined sets of elements without the need of rewriting the same instructions for different sets. These sets of instructions are then transformed into XSL instructions that can be processed by any XSL processor.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for further adapting eXtensible Stylesheet Language (XSL) to HyperText Markup Language (HTML) document transformations, the method comprising:
   identifying, by a web computing device, a plurality of rules matching one or more elements in an HTML document;
   identifying, by the web computing device, a plurality of actions associated with each of the identified plurality of rules;
   grouping, by the web computing device, each of the matching identified plurality of actions together into one or more corresponding groups;
   filtering, by the web computing device, the grouped plurality of actions based on one or more filtering rules when two or more of the grouped plurality of actions match;
   removing, by the web computing device, one or more of the plurality of actions in each of the one or more corresponding groups based on the one or more filtering rules;
   applying, by the web computing device, the remaining grouped plurality of actions that match after the filtering to transform the matching one or more elements in the HTML document; and
   providing, by the web computing device, the transformed HTML document.

2. The method as set forth in claim 1, further comprising: determining, by the web computing device, when two or more of the identified plurality of actions associated with each of the identified plurality of rules match.

3. The method as set forth in claim 1, wherein the one or more filtering rules comprises removing remove-element, replace-element, linearize-table, set-meta-category, move-bottom, set-attribute, remove-attribute, set-content, or append-content when the identified plurality of actions in the one or more corresponding groups comprises remove-element.

4. The method as set forth in claim 1, wherein the one or more filtering rules comprises removing remove-element, replace-element, or linearize-table when the identified plurality of actions in the one or more corresponding groups comprises replace-element.

5. The method as set forth in claim 1, wherein the one or more filtering rules comprises removing remove-element, replace-element, linearize-table, set-meta-category, set-attribute, remove-attribute, set-content, append-content, all preceding set-meta-category, set-attribute, remove-attribute, set-content, or append-content when the identified plurality of actions in the one or more corresponding groups comprises linearize-table.

6. The method as set forth in claim 1, wherein the one or more filtering rules comprises removing remove-element or set-meta-category when the identified plurality of actions in the one or more corresponding groups comprises set-meta-category.

7. The method as set forth in claim 1, wherein the one or more filtering rules comprises removing remove-element or move-bottom from the one or more filtering rules when the identified plurality of actions in the one or more corresponding groups comprises move-bottom.

8. The method as set forth in claim 1, wherein the one or more filtering rules comprises removing remove-element or set-attribute when a name parameter of a following action is equal to the name parameter of the matching action, and removing remove-attribute when a name parameter of a following action is equal to the name parameter of the matching action and when the identified plurality of actions in the one or more corresponding groups comprises set-attribute.

9. The method as set forth in claim 1, wherein the one or more filtering rules comprises removing remove-element or set-attribute when a name parameter of a following action is equal to the name parameter of the matching action, and removing remove-attribute when a name parameter of a following action is equal to the name parameter of the matching action when the identified plurality of actions in the one or more corresponding groups comprises remove-attribute.

10. The method as set forth in claim 1, wherein the one or more filtering rules comprises removing remove-element, set-content, or append-content when the identified plurality of actions in the one or more corresponding groups comprises set-content.

11. The method as set forth in claim 1, wherein the one or more filtering rules comprises removing remove-element, set-content, or append-content when the identified plurality of actions in the one or more corresponding groups comprises append-content.

12. The method as set forth in claim 1, wherein the plurality of actions comprises remove-element replace-element, linearize-table, set-meta-category, move-bottom, set-attribute, remove-attribute, set-content, or append-content.

13. A non-transitory computer readable medium having stored thereon instructions for further adapting eXtensible Stylesheet Language (XSL) to HyperText Markup Language (HTML) document transformations comprising machine executable code which when executed by at least one processor, causes the processor to perform steps comprising:
    identifying a plurality of rules matching one or more elements in an HTML document;
    identifying a plurality of actions associated with each of the identified plurality of rules;
    grouping each of the matching identified plurality of actions together into one or more corresponding groups;
    filtering the grouped plurality of actions based on one or more filtering rules when two or more of the grouped plurality of actions match;
    removing one or more of the plurality of actions in each of the one or more corresponding groups based on the one or more filtering rules;
    applying the remaining grouped plurality of actions that match after the filtering to transform the matching one or more elements in the HTML document; and
    providing the transformed HTML document.

14. The medium as set forth in claim 13, further having stored thereon instructions comprising machine executable code which when executed by the processor further causes the processor to perform steps further comprising:
    determining when two or more of the identified plurality of actions associated with each of the identified plurality of rules match.

15. The medium as set forth in claim 13, wherein the one or more filtering rules comprises removing remove-element, replace-element, linearize-table, set-meta-category, move-bottom, set-attribute, remove-attribute, set-content, or append-content when the identified plurality of actions in the one or more corresponding groups comprises remove-element.

16. The medium as set forth in claim 13, wherein the one or more filtering rules comprises removing remove-element, replace-element, or linearize-table when the identified plurality of actions in the one or more corresponding groups comprises replace-element.

17. The medium as set forth in claim 13, wherein the one or more filtering rules comprises removing remove-element, replace-element, linearize-table, set-meta-category, set-attribute, remove-attribute, set-content, append-content and removing all preceding set-meta-category, set-attribute, remove-attribute, set-content, or append-content when the identified plurality of actions in the one or more corresponding groups comprises linearize-table.

18. The medium as set forth in claim 13, wherein the one or more filtering rules comprises removing remove-element or set-meta-category when the identified plurality of actions in the one or more corresponding groups comprises set-meta-category.

19. The medium as set forth in claim 13, wherein the one or more filtering rules comprises removing remove-element or move-bottom when the identified plurality of actions in the one or more corresponding groups comprises move-bottom.

20. The medium as set forth in claim 13, wherein the one or more filtering rules comprises removing remove-element or set-attribute when a name parameter of a following action is equal to a name parameter of the matching action, and removing remove-attribute when a name parameter of a following action is equal to a name parameter of the matching action when the identified plurality of actions in the one or more corresponding groups comprises set-attribute.

21. The medium as set forth in claim 13, wherein the one or more filtering rules comprises removing remove-element or set- attribute when a name parameter of a following action is equal to a name parameter of the matching action, and removing remove-attribute when a name parameter of a following action is equal to a name parameter of the matching action when the identified plurality of actions in the one or more corresponding groups comprises remove-attribute.

22. The medium as set forth in claim 13, wherein the one or more filtering rules comprises removing remove-element, set-content, or append-content when the identified plurality of actions in the one or more corresponding groups comprises set-content.

23. The medium as set forth in claim 13, wherein the one or more filtering rules comprises removing remove-element, set-content, or append -content when the identified plurality of actions in the one or more corresponding groups comprises append-content.

24. The medium as set forth in claim 13, wherein the plurality of actions comprises remove-element, replace-element, linearize-table, set-meta-category, move-bottom, set-attribute, remove-attribute, set-content, or append-content.

25. A web proxy computing apparatus comprising: one or more processors;
    a memory coupled to the one or more processors which are configured to be capable of executing programmed instructions stored in the memory comprising:
    identifying a plurality of rules matching one or more elements in a HyperText Markup Language (HTML) document;
    identifying a plurality of actions associated with each of the identified plurality of rules;
    grouping each of the matching identified plurality of actions together into one or more corresponding groups;
    filtering the grouped plurality of actions based on one or more filtering rules when two or more of the grouped actions associated with each of the identified plurality of rules match;
    removing one or more of the plurality of actions in each of the one or more corresponding groups based on the one or more filtering rules;
    applying the remaining grouped plurality of actions that match after the filtering to transform the matching one or more elements in the HTML document; and
    providing the transformed HTML document.

26. The apparatus as set forth in claim 25 wherein the one or more processors is further configured to be capable of executing programmed instructions stored in the memory further comprising:
    determining when two or more of the identified plurality of actions associated with each of the identified plurality of rules match.

27. The apparatus as set forth in claim 25, wherein the one or more filtering rules comprises removing remove-element, replace-element, linearize-table, set-meta-category, move-bottom, set-attribute, remove-attribute, set-content, or append-content when the identified plurality of actions in the one or more corresponding groups comprises remove-element.

28. The apparatus as set forth in claim 25 wherein the one or more filtering rules comprises removing remove-element, replace-element, or linearize-table when the identified plurality of actions in the one or more corresponding groups comprises replace-element.

29. The apparatus as set forth in claim 25 wherein the one or more filtering rules comprises removing remove-element, replace-element, linearize-table, set-meta-category, set-attribute, remove-attribute, set-content, append-content and removing all preceding set-meta-category, set-attribute, remove-attribute, set-content, or append-content when the identified plurality of actions in the one or more corresponding groups comprises linearize-table.

30. The apparatus as set forth in claim 25, wherein the one or more filtering rules comprises removing remove-element or set-meta-category when the plurality of actions in the one or more corresponding groups comprises set-meta-category.

31. The apparatus as set forth in claim 25, wherein the one or more filtering rules comprises removing remove-element or move-bottom when the identified plurality of actions in the one or more corresponding groups comprises move-bottom.

32. The apparatus as set forth in claim 25, wherein the one or more filtering rules comprises removing remove-element or set-attribute when a name parameter of a following action is equal to a name parameter of the matching action, and removing remove-attribute when a name parameter of a following action is equal to a name parameter of the matching action when the identified plurality of actions in the one or more corresponding groups comprises set-attribute.

33. The apparatus as set forth in claim 25, wherein the one or more filtering rules comprises removing remove-element or set-attribute when a name parameter of a following action is equal to the name parameter of the matching action, and removing remove-attribute when a name parameter of a following action is equal to a name parameter of the matching action when the identified plurality of actions in the one or more corresponding groups comprises remove-attribute.

34. The apparatus as set forth in claim 25 wherein the one or more filtering rules comprises removing remove-element, set-content, or append-content when the identified plurality of actions in the one or more corresponding groups comprises set-content.

35. The apparatus as set forth in claim 25 wherein the one or more filtering rules comprises removing remove-element, set-content, or append-content from the one or more filtering rules when the identified plurality of actions in the one or more corresponding groups comprises append-content.

36. The apparatus as set forth in claim 25, wherein the plurality of actions comprises remove-element, replace-element, linearize-table, set-meta-category, move-bottom, set-attribute, remove-attribute, set-content, or append-content.

* * * * *

UNITED STATES PATENT AND TRADEMARK OFFICE
CERTIFICATE OF CORRECTION

PATENT NO. : 9,275,023 B2
APPLICATION NO. : 12/806716
DATED : March 1, 2016
INVENTOR(S) : Enrico Scoda Page 1 of 1

It is certified that error appears in the above-identified patent and that said Letters Patent is hereby corrected as shown below:

On the title page at item (75) Inventor, delete "Matignacco" and insert in its place --Martignacco--.

Signed and Sealed this
Twenty-fourth Day of May, 2016

Michelle K. Lee
*Director of the United States Patent and Trademark Office*